Nov. 17, 1936.  G. E. PARKER  2,061,006
CLUTCH CONTROL
Filed May 24, 1935  2 Sheets-Sheet 2

Inventor
Guy E. Parker
By Blackmore, Spencer & Hink
Attorney

Patented Nov. 17, 1936

2,061,006

UNITED STATES PATENT OFFICE 2,061,006

CLUTCH CONTROL

Guy E. Parker, Birmingham, Mich., assignor to General Motors Corporation, Detroit, Mich., a corporation of Delaware Application May 24, 1935, Serial No. 23,232

1 Claim. (Cl. 180—64)

This invention relates to clutches and particularly to the mechanism for releasing the clutch of a motor vehicle. The invention is of especial utility on a motor vehicle having its engine resiliently supported.

An object of the invention is to ensure that the movement of the clutch releasing lever shall be effective to release the clutch with no tendency to move the engine even if the latter is supported on soft cushions.

A further object is to so connect the clutch releasing lever with the clutch throwout mechanism as to permit the engine and clutch housing to move bodily without affecting the position of the releasing lever.

Other objects and advantages will be understood from the following description.

In the drawings accompanying this description:

Figure 1:
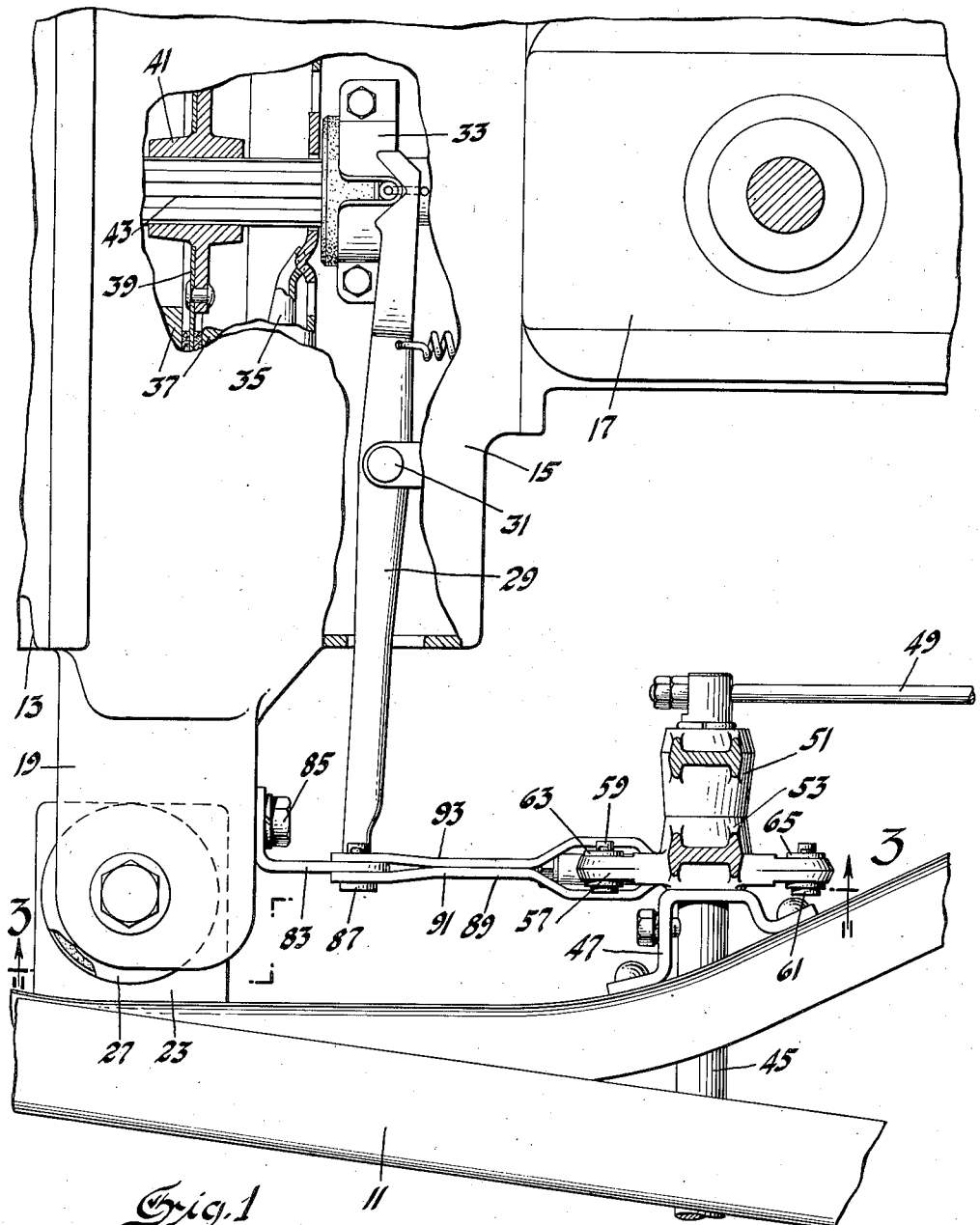
Fig. 1 is a top plan view of a part of the frame and power plant of a motor vehicle with my invention incorporated therein and with parts broken away and in section.
Figure 2:
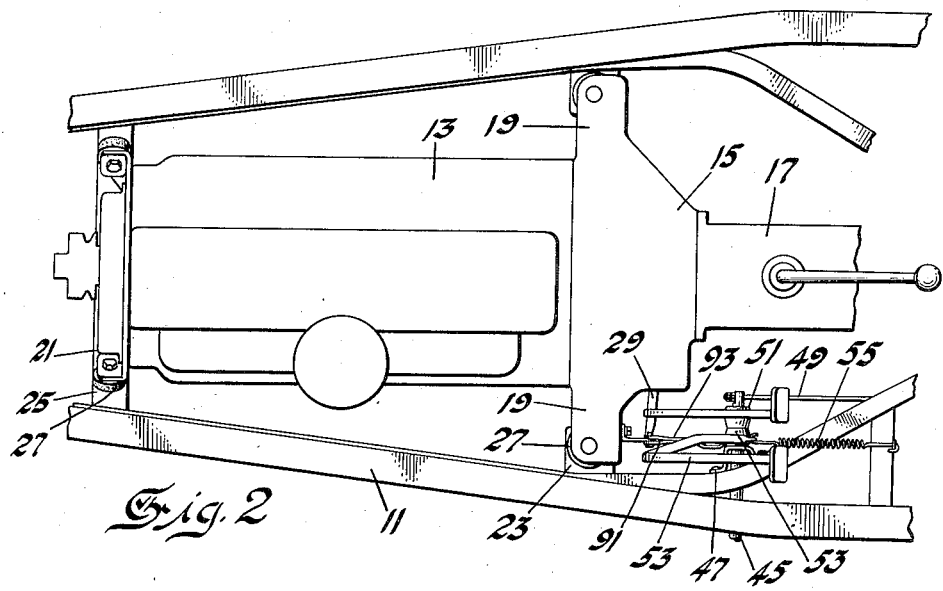
Fig. 2 is a top plan view on a smaller scale.
Figure 3:
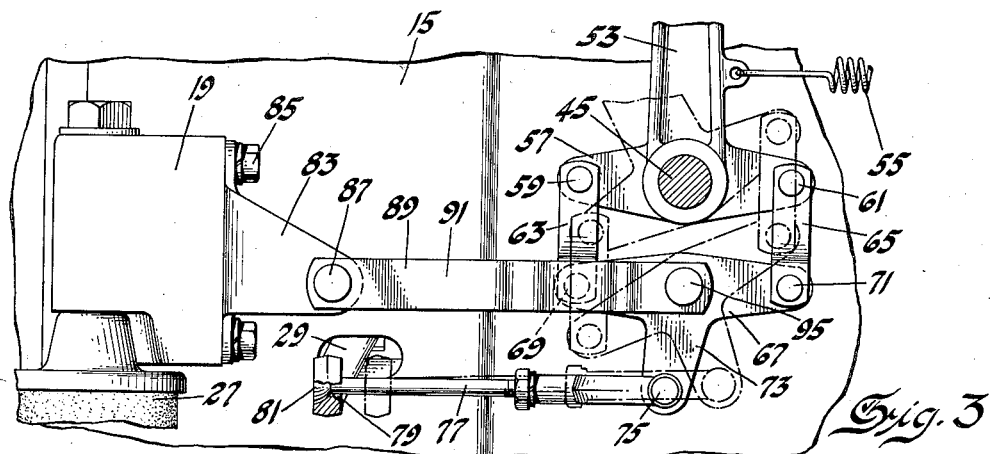
Fig. 3 is a section on line 3—3 of Fig. 1.

Referring by reference characters to the drawings, numeral 11 represents the chassis frame of a motor vehicle, the engine being marked 13. As is common practice, the engine is made rigid with the clutch housing 15 and the ratio-changing mechanism 17. This power unit including the engine, clutch housing and shift mechanism is mounted on the frame. The supporting means may be by means of arms such as 19 and 21 extending from the engine, frame supports 23 and 25 and rubber cushions 27. In this way the engine may rock about its predetermined axis of oscillation and may have fore and aft movements relative to the frame.

No novelty is claimed for the clutch, per se. It is illustrated only sufficiently to show its relation to other parts. There is a throwout lever 29 extending horizontally and pivoted at 31 to the housing 15. When lever 29 is rocked counterclockwise (Fig. 1) it pushes a throwout device 33 which latter rocks fingers, one of which is shown at 35. The rotation of the fingers withdraws one or more driving pressure plates 37 from a driven plate 39 carried by a hub 41 on the clutch driven shaft 43.

On the frame there is a shaft 45 supported in any convenient way as by a bracket 47 and a rod 49. Rotatably mounted on shaft 45 is a brake lever 51 and a clutch release lever 53. The latter is held in its idle, clutch engaged position by a spring 55.

The connection between the release lever 53 and the throwout lever constitutes the subject matter of the invention. The occasion for the novel structure will be appreciated when it is remembered that the release lever 53 is carried by the frame but that the throwout lever may move bodily with bodily movements of the power plant relative to the frame. At 57 is a cross head forming a part of the lever 53. At its ends are pivots 59 and 61 upon which swing links 63 and 65. A somewhat T-shaped floating link 67 has at the opposite ends of its cross head pivots 69 and 71. The lower ends of links 63 and 65 are carried on pivots 69 and 71. The T-shaped link 67 has a downwardly directed arm 73. To the lower end of arm 73 as at 75 there is pivoted a connecting rod 77 extending through an opening 79 in the end of throwout lever 29. A rounded head 81 on rod 77 engages a spherical seat on lever 29. At 83 is a bracket secured to the engine by fastening means 85. To this bracket at 87 is pivoted a link 89, the pivot 87 being somewhat above the rounded head 81 on rod 77. Link 89 is formed by a pair of link elements 91 and 93. These elements are spread adjacent the lower end of link 63 so that they straddle the pin 69. They are united to the T-shaped link 67 at about the middle of its cross head, this point being marked 95. The distance between pivots 95 and 75 is substantially the same as the distance between points 87 and 81, so that links 77 and 89 are substantially parallel. The cross head 57 of the lever or pedal 53 together with the cross head of the T-shaped link 67 and the connecting links 63 and 65 are dimensioned to form a parallelogram.

When the pedal or lever 53 is rocked counterclockwise the T-shaped link 67 is moved to the dotted line position and the link 77 acts in tension to pull lever 29 and release the clutch. The link 89 is under compression so that the pedal movement cannot move the engine no matter how soft its cushion support. The reason for this action may be briefly stated as follows: Let it be assumed that the pedal has been rocked to a predetermined position. Owing to the parallel linkage involving parts 57, 63, 65, and 67, 67 is maintained in parallelism with 57. If no link 89 were present the resistance to the movement of the throwout lever would tend to hold point 75 fixed. The necessary parallelism between 57 and 67 would then cause 67 to rock about point 75 and point 95 would move toward point 87. When link 89 is used it resists by compression such a movement of point 95. It therefore will be obvious that the tension in 77 tending to pull the engine is balanced by a compression in 89 tending to push the engine and the only movement resulting from pedal depression is the movement of the lever 29.

Figure 4:
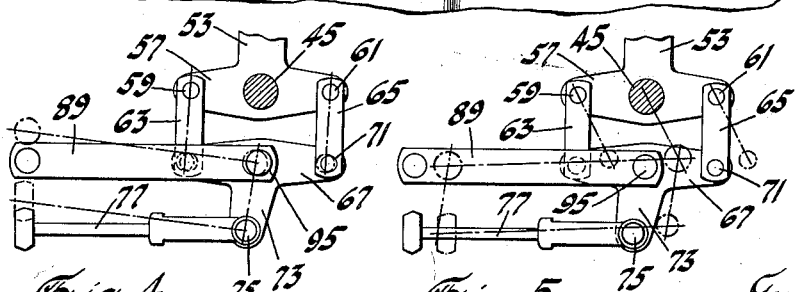
Fig. 4 and Fig. 5 are diagrammatic views to show the effects of movements of the power plant relative to the chassis frame.
Figure 5:
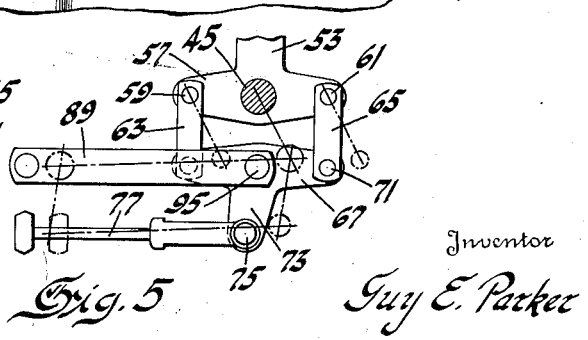

Furthermore, if the power plant rocks about its normal longitudinal axis of oscillation, points 81 and 87 move in an arc of which the vertical component is the major part, the horizontal component being negligible. Fig. 4 illustrates such a movement. It will be seen the parallel links 77 and 89 permit this motion together with a slight accommodating movement of links 63 and 65 but with no tendency to rock the pedal. Similarly a bodily movement of the power plant in a horizontal direction is provided for by links 63 and 65 and so well shown by Fig. 5 that description seems superfluous.

It will therefore be appreciated that every increment of motion given the pedal is transmitted into motion of the throwout lever 29 whatever be the momentary position of the power plant, but that the power plant is free to move upon its cushioned support without affecting the position of the pedal, and (and this is more important) without producing a reaction upon the lever 29 which would cause clutch chatter if, at the time of such power plant movement, the pedal is being held by the operator.

I claim:

In combination, a frame, a motor block comprising an engine and a clutch, said clutch provided with a pivoted throwout lever, means to movably mount said block on said frame whereby said throwout lever moves bodily relative to said frame, a clutch releasing lever, a pivot on said frame to rotatably support said releasing lever, said releasing lever having an integral cross head formed by arms extending in diametrically opposite directions from the pivot of said releasing lever, a floating link having a link head parallel with said cross head, a first pair of parallel links connecting the ends of said link head and cross head whereby said cross head, link head and parallel links form a collapsible parallelogram, said floating link having an arm extending at an angle from said head, a second pair of parallel links, the ends of a first link of said second pair being connected to said throwout lever and to said arm of said floating link, the ends of the other link of said second pair being connected to said block and to an intermediate point of the head of said floating link between the points of connection of the links of the first mentioned pair of parallel links.

GUY E. PARKER.